W. M. HOLMES.
MACHINE FOR COMPRESSING COTTON, &c.
APPLICATION FILED NOV. 17, 1902.

931,762.

Patented Aug. 24, 1909.
12 SHEETS—SHEET 1.

Witnesses.
Wm M. Rheem.
Joseph T. Brennan.

Inventor
Watson M. Holmes
by Roberts & Mitchell,
Attys.

W. M. HOLMES.
MACHINE FOR COMPRESSING COTTON, &c.
APPLICATION FILED NOV. 17, 1902.
931,762.
Patented Aug. 24, 1909.
12 SHEETS—SHEET 2.
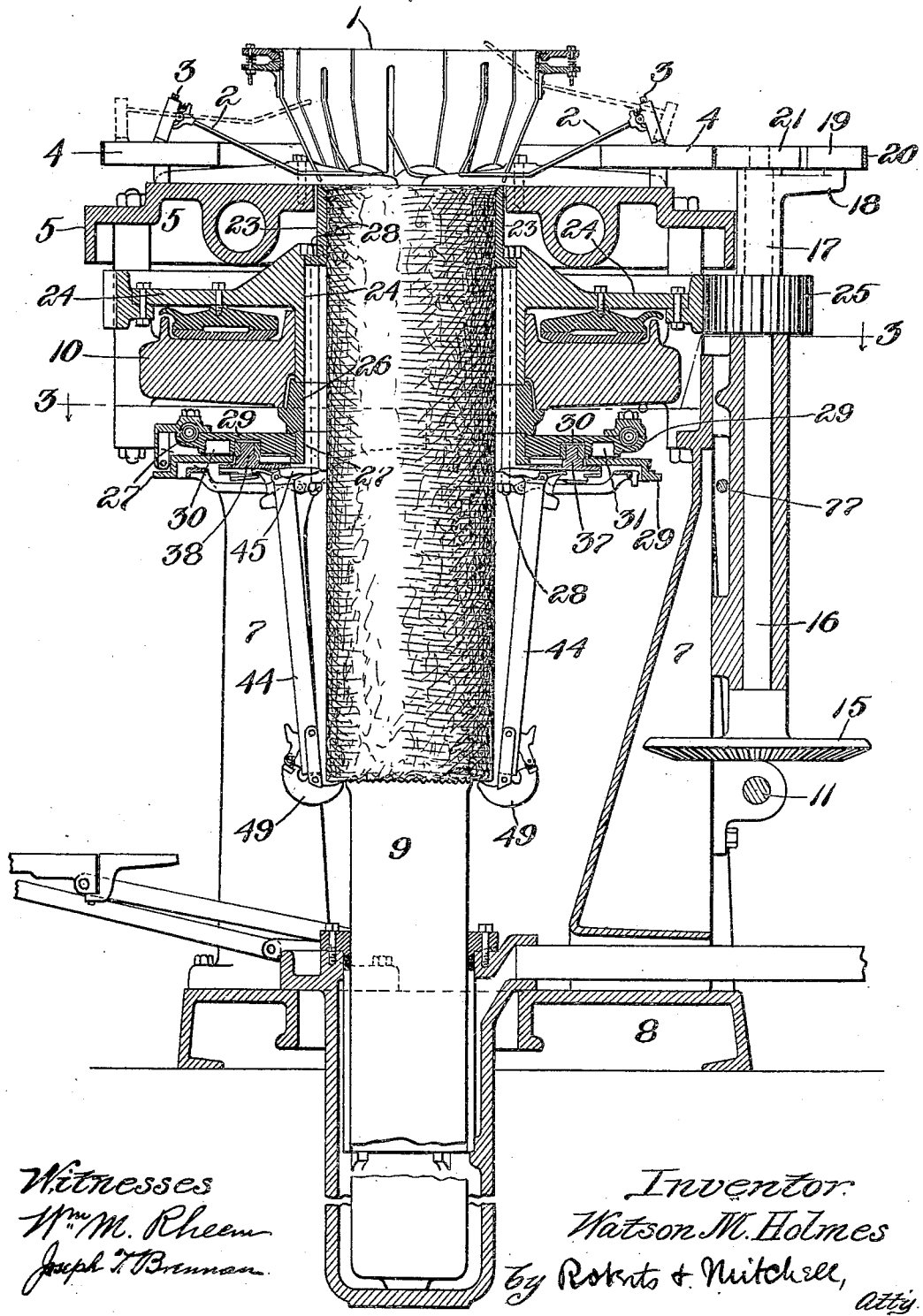

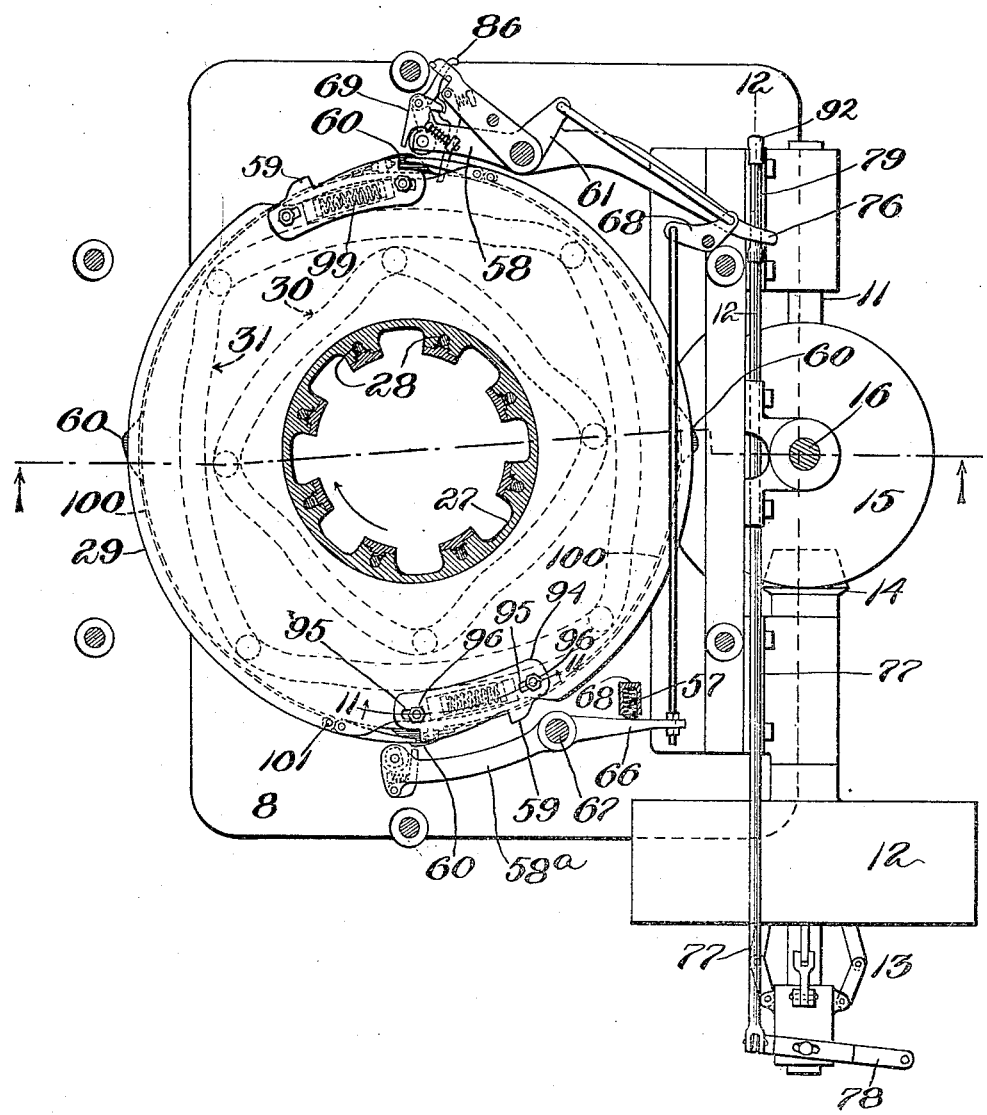

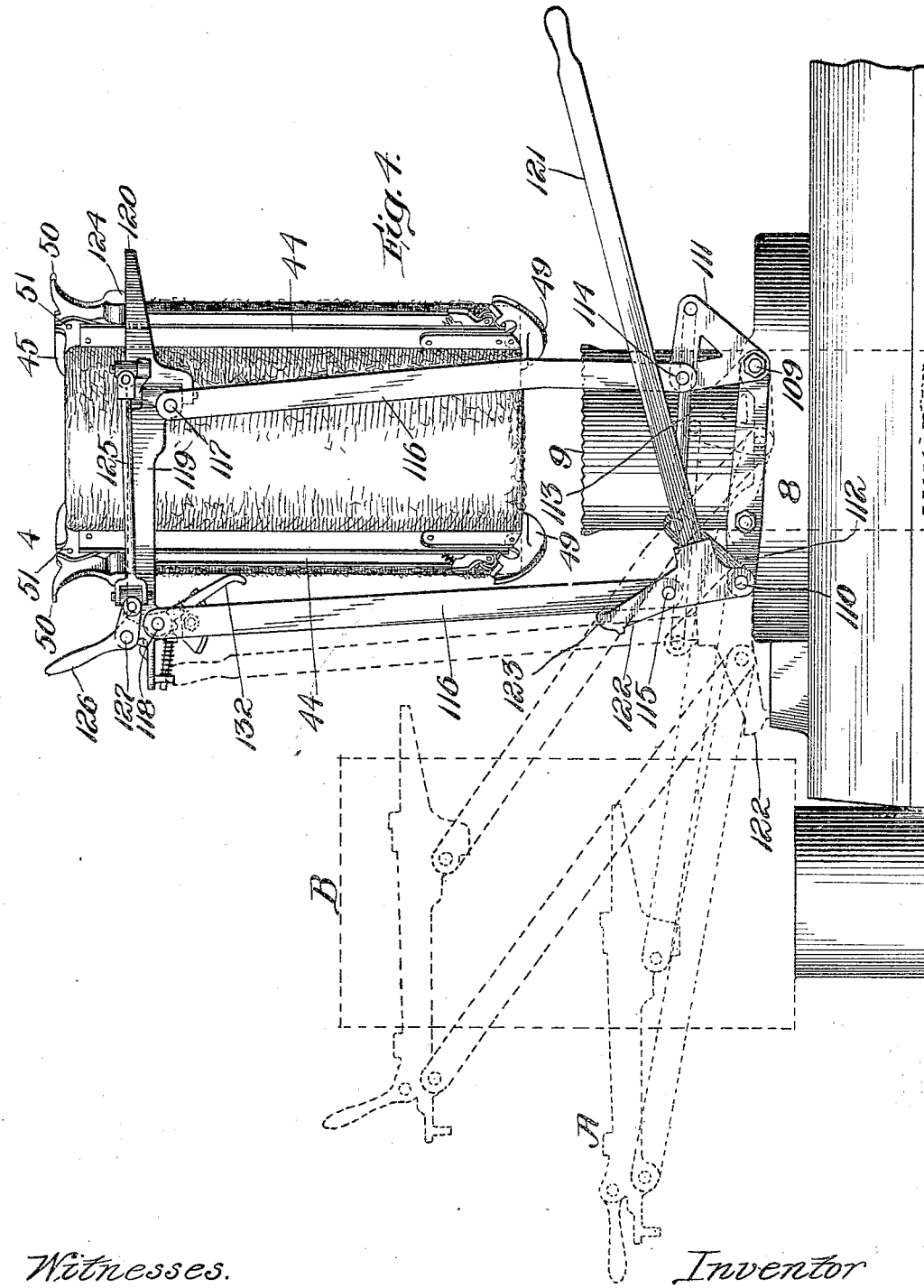

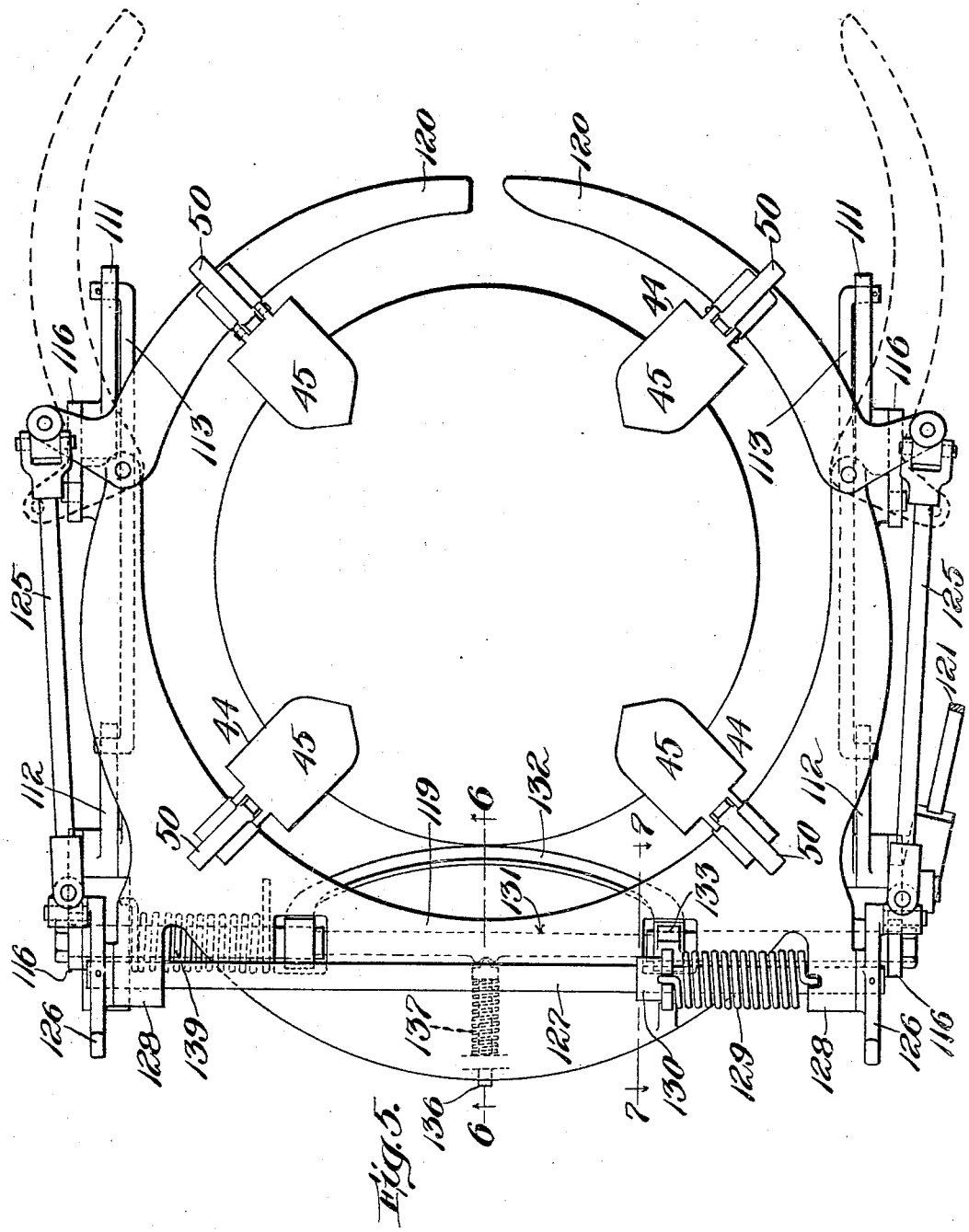

W. M. HOLMES.
MACHINE FOR COMPRESSING COTTON, &c.
APPLICATION FILED NOV. 17, 1902.
931,762.
Patented Aug. 24, 1909.
12 SHEETS—SHEET 6.
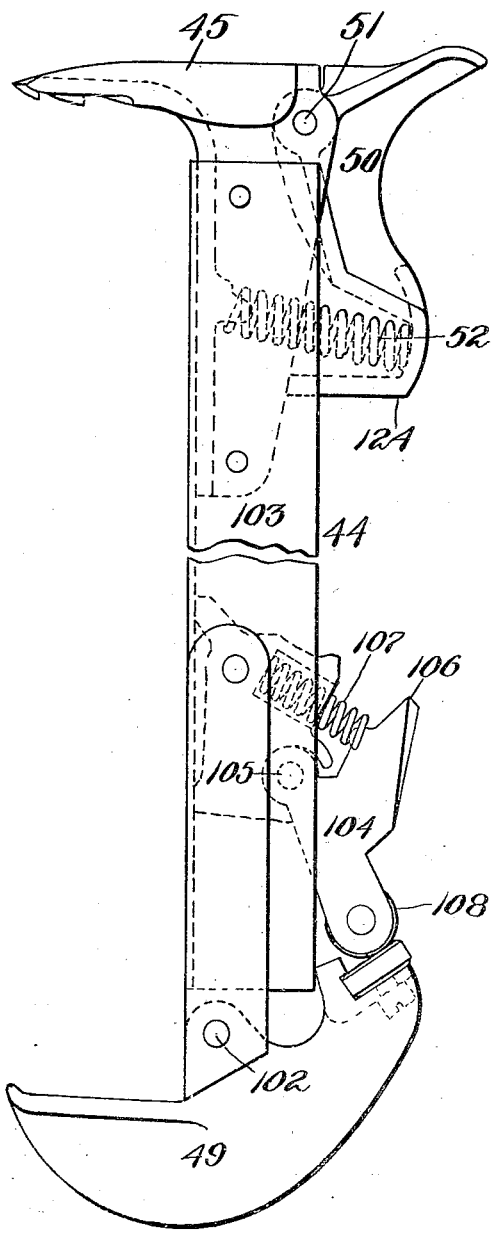
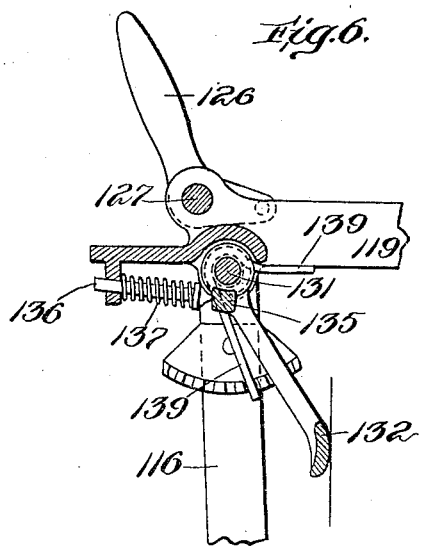
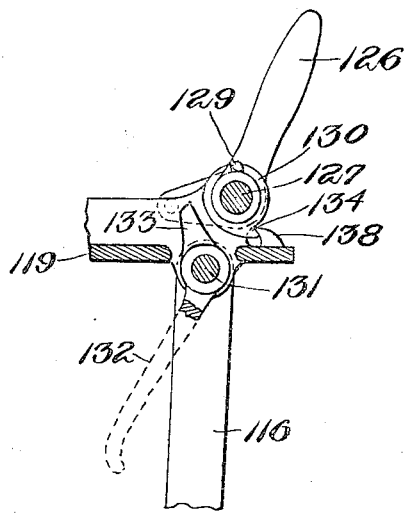
Inventor
Watson M. Holmes
by Roberts & Mitchell
Atty.

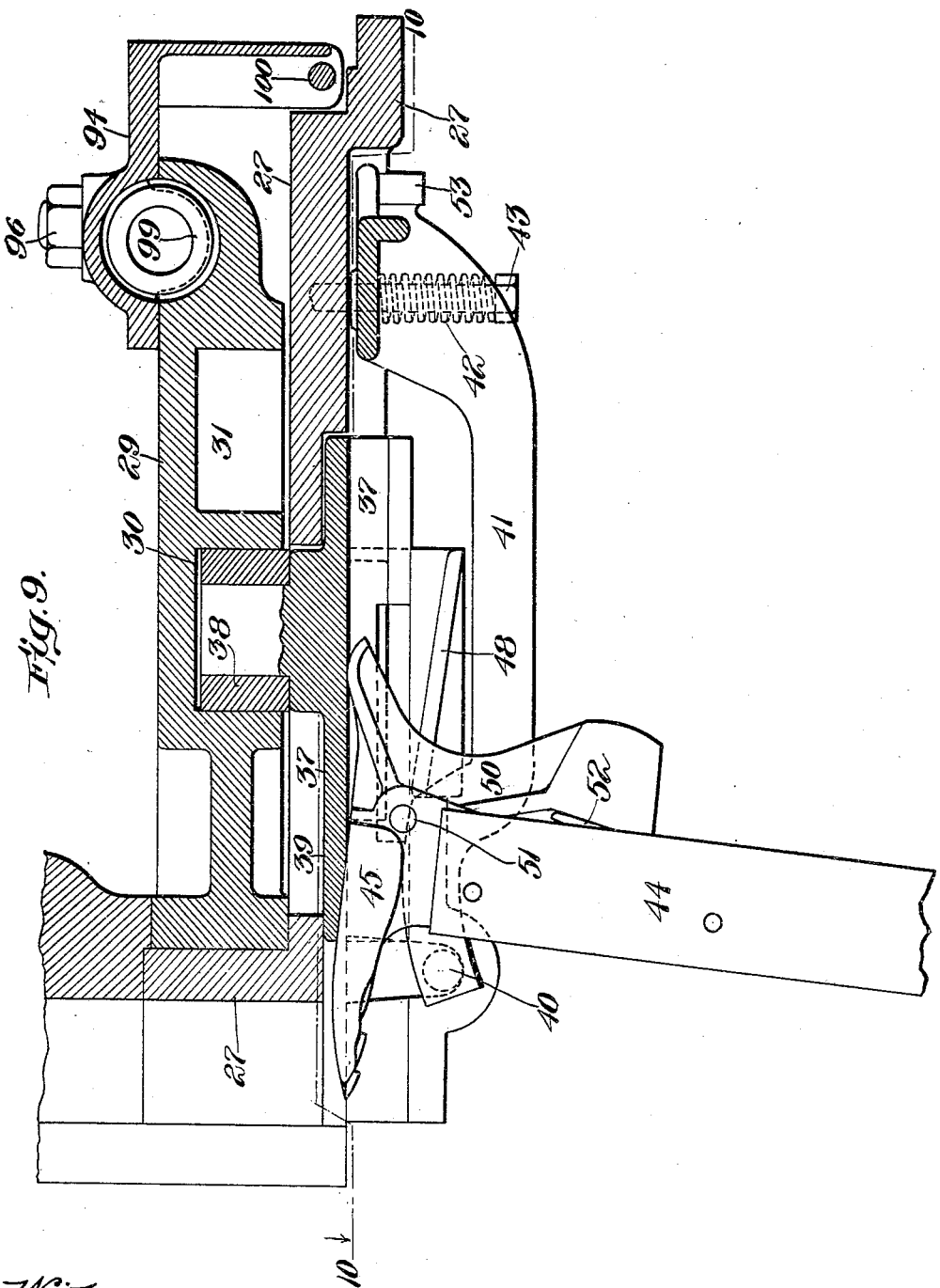

W. M. HOLMES.
MACHINE FOR COMPRESSING COTTON, &c.
APPLICATION FILED NOV. 17, 1902.
931,762.
Patented Aug. 24, 1909.
12 SHEETS—SHEET 8.
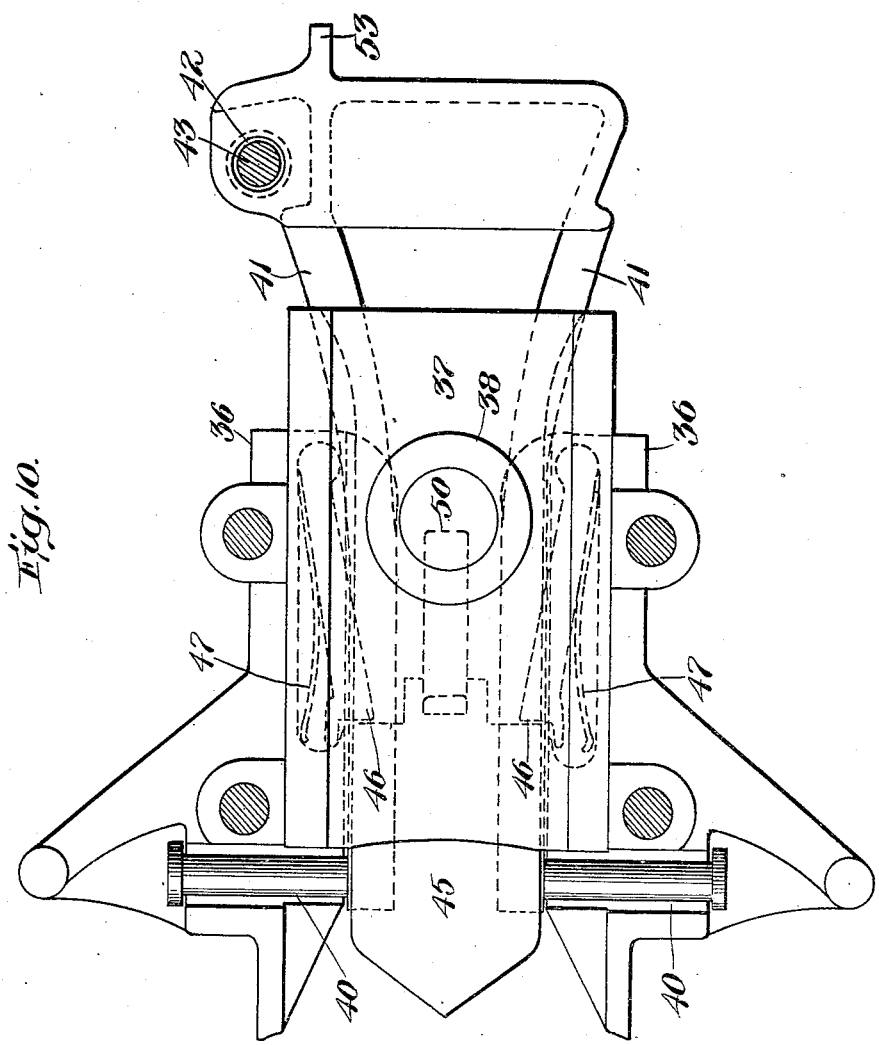

W. M. HOLMES.
MACHINE FOR COMPRESSING COTTON, &c.
APPLICATION FILED NOV. 17, 1902.

931,762.

Patented Aug. 24, 1909.
12 SHEETS—SHEET 9.

Witnesses.
Wm. M. Rheem.
Joseph T. Brennan.

Inventor.
Watson M. Holmes
by Roberts & Mitchell,
atty.

W. M. HOLMES.
MACHINE FOR COMPRESSING COTTON, &c.
APPLICATION FILED NOV. 17, 1902.

931,762.

Patented Aug. 24, 1909.
12 SHEETS—SHEET 11.

Witnesses.
Wm. M. Rheem
Joseph T. Brennan

Inventor
Watson M. Holmes
By Roberts & Mitchell, Attys.

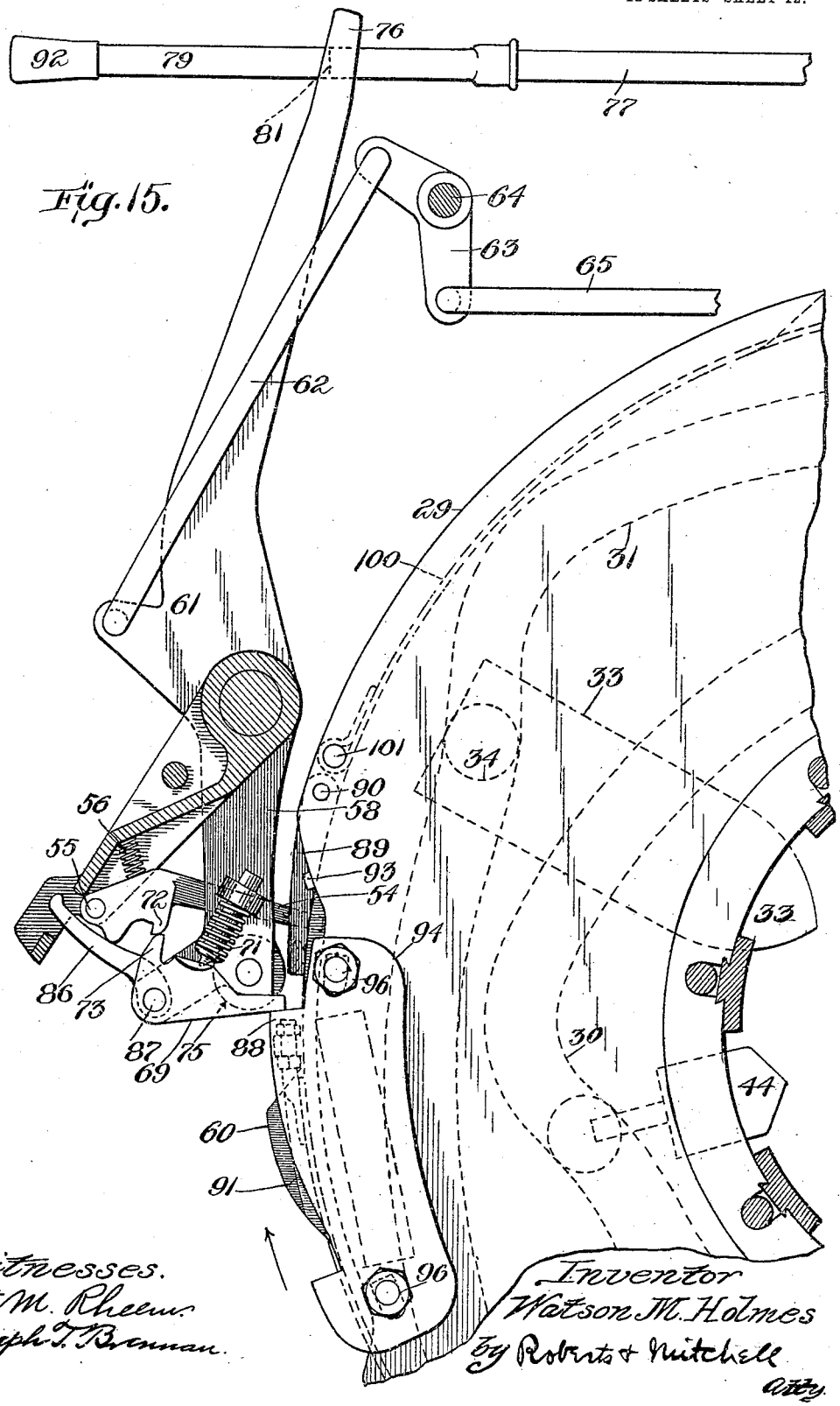

UNITED STATES PATENT OFFICE.

WATSON M. HOLMES, OF HOOSICK FALLS, NEW YORK, ASSIGNOR TO PLANTERS COMPRESS COMPANY, OF BOSTON, MASSACHUSETTS, A CORPORATION OF MAINE.

MACHINE FOR COMPRESSING COTTON, &c.

931,762.     Specification of Letters Patent.    Patented Aug. 24, 1909.

Application filed November 17, 1902. Serial No. 131,673.

*To all whom it may concern:*

Be it known that I, WATSON M. HOLMES, of Hoosick Falls, in the county of Rensselaer and State of New York, have invented an Improved Machine for Compressing Cotton and other Fibrous Material, of which the following is a specification, reference being had therein to the accompanying drawings, in which—

Figure 1:
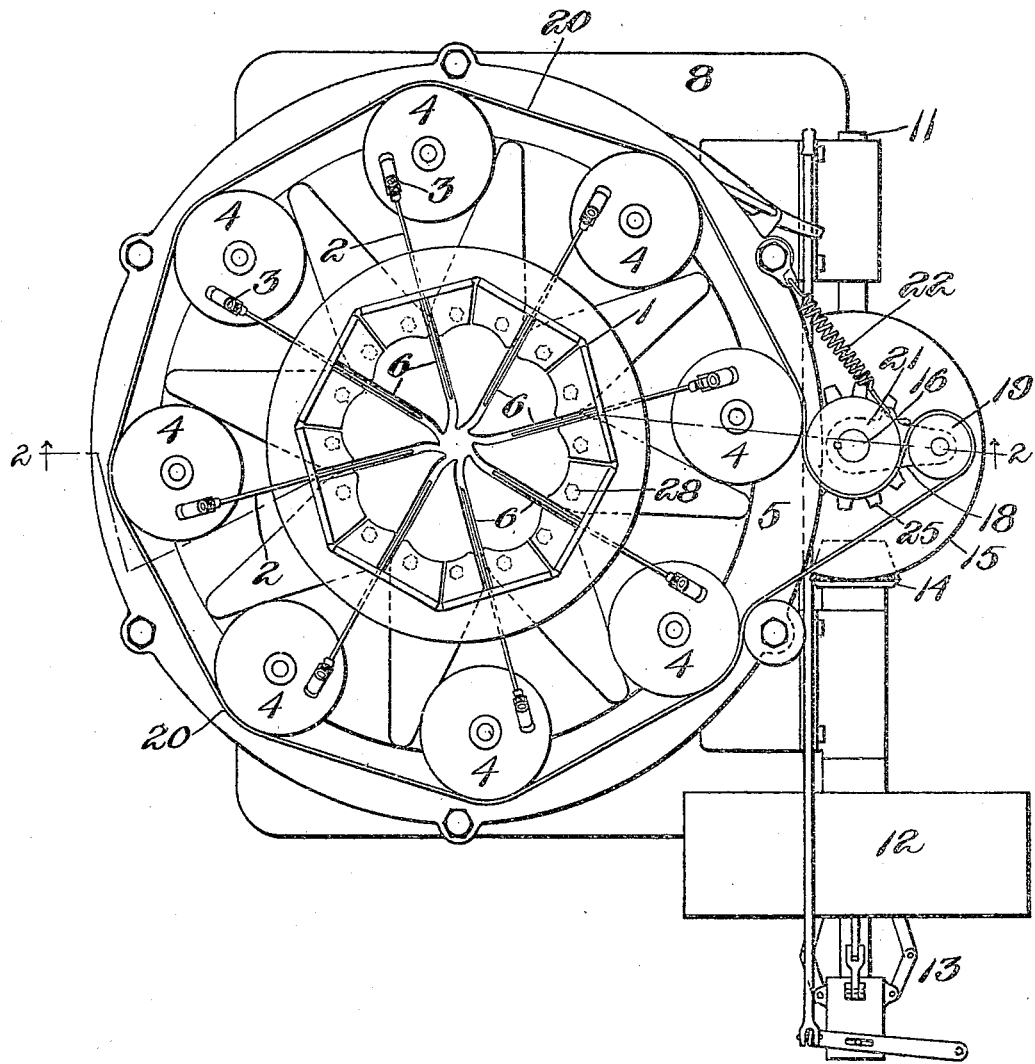
Figure 11:
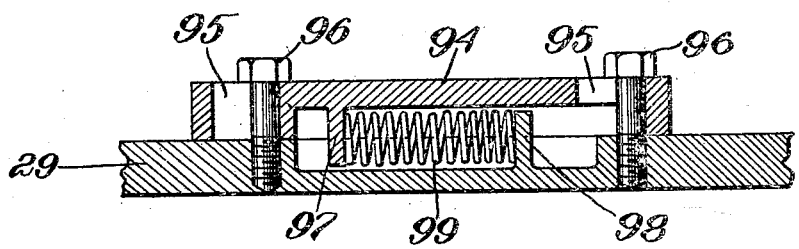
Figure 12:
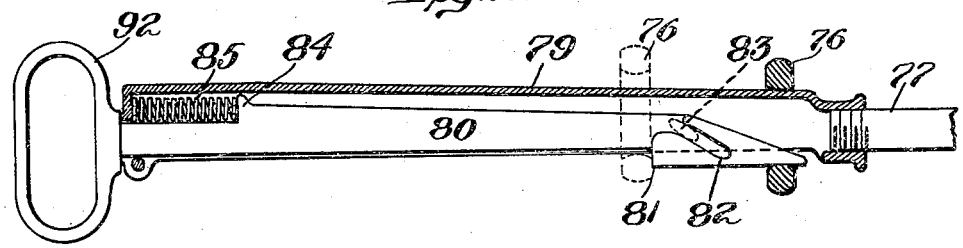
Figure 13:
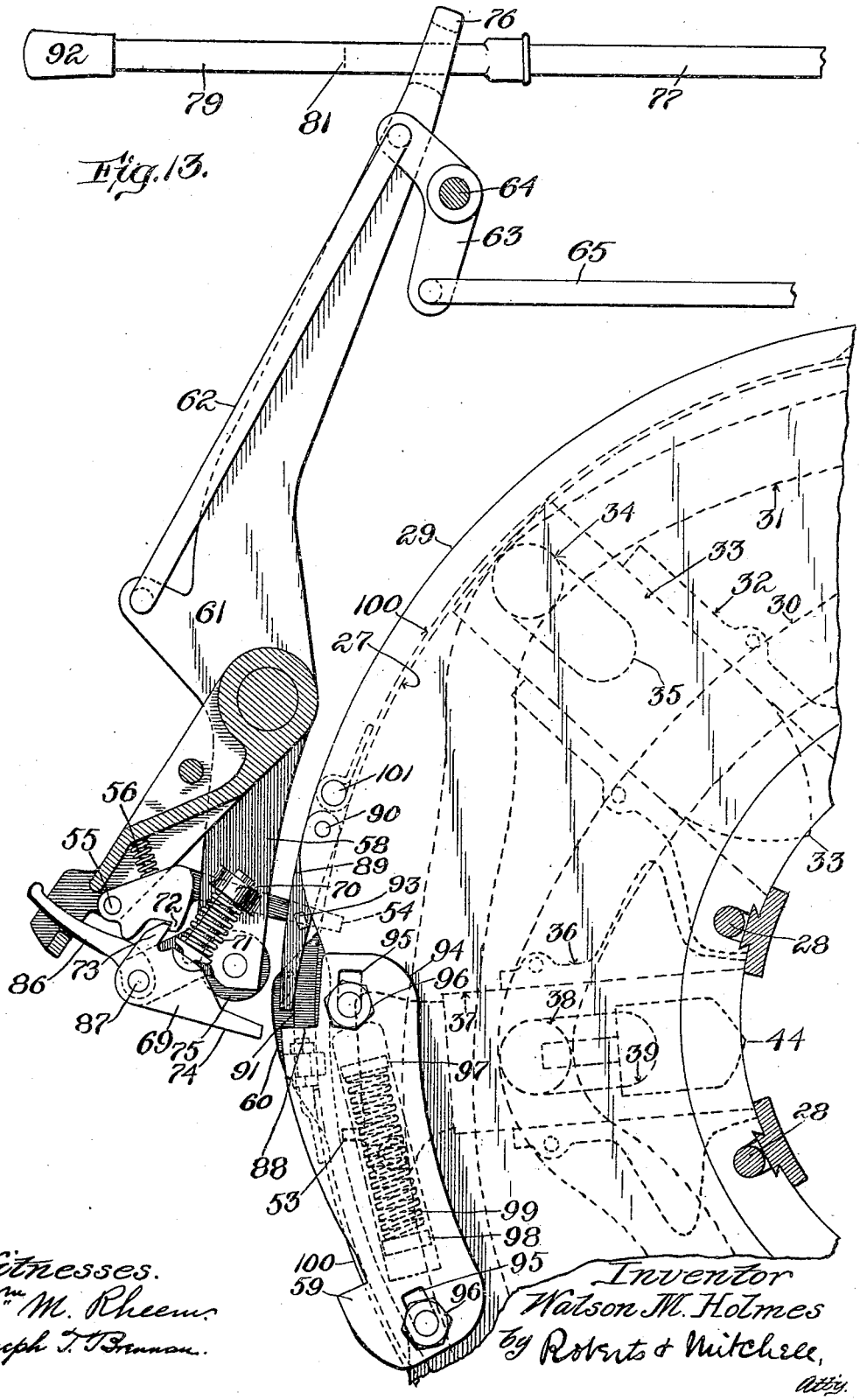
Figure 14:
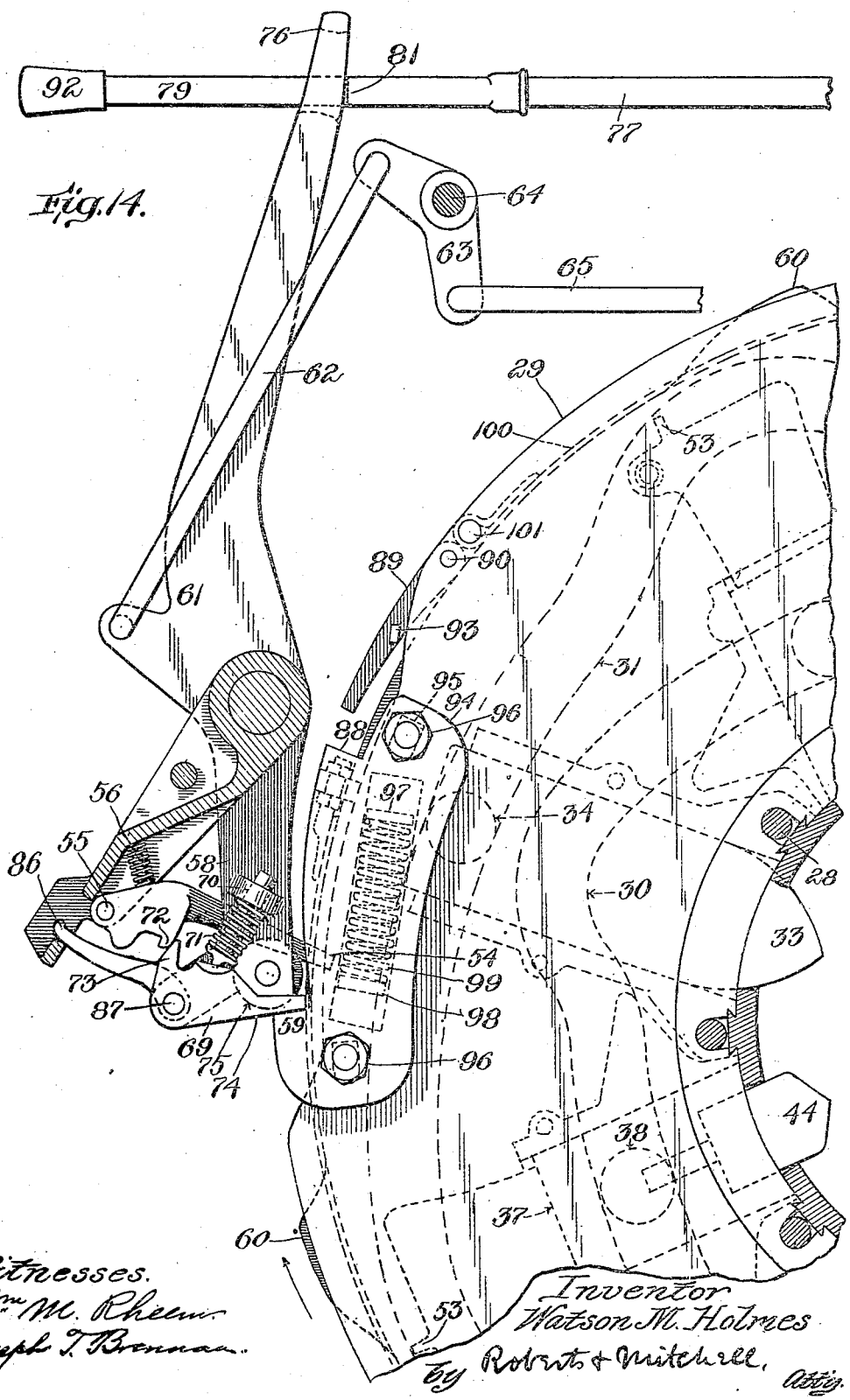

Figure 1 is a plan view of my improved machine. Fig. 2 is a vertical longitudinal section on line 2—2 of Fig. 1. Fig. 3 is a horizontal section on line 3—3 of Fig. 2, viewed in the direction indicated by the arrows. Fig. 4 is a side elevation of the lower part of the machine shown in Fig. 1, showing the bale removing means. Fig. 5 is a plan view of the bale removing means. Fig. 6 is a fragmental section of the bale removing means taken on line 6—6 of Fig. 5, viewed in the direction indicated by the arrows. Fig. 7 is also a fragmental section of the bale removing means taken on line 7—7 of Fig. 5, viewed in the direction indicated by the arrows. Fig. 8 is a side elevation of the bale stay. Fig. 9 is a fragmental section, taken through the knife supporting ring and cam ring, showing one of the bale stays in position ready to be forced into the column. Fig. 10 is a sectional plan view of Fig. 9 viewed in the direction indicated by the arrows. Fig. 11 is a fragmental section on line 11—11 of Fig. 3, through the cam ring, and the movable buffer. Fig. 12 is a section through the shifter rod handle, taken on line 12—12 of Fig. 3. Figs. 13, 14 and 15 are sectional plan views of a portion of the machine.

My invention relates to machines for compressing cotton, hay or other fibrous materials, and more particularly to that class of machines for this purpose which form the material into a compressed column from which a length or section is severed, at intervals, to form a commercial bale.

The invention has for its object to improve the construction of machines of this kind to the end that they shall be more automatic in their action than heretofore, and also to provide a machine of this class in which the length of time during which the operation of the machine is stopped for the purpose of severing and removing a bale from the column, shall be reduced to a minimum, and so as to make it unnecessary to stop the action of the gins or other means which feed the fibrous material to the machine.

A feature of my improved machine consists in providing, in connection with the compressing mechanism, means which act automatically to sever a section or bale from the compressed column of fiber when the latter has reached a predetermined size.

Heretofore it has been customary to apply stays to the section or bale at the same time that it is severed from the column, and these stays act to temporarily hold the severed section against expansion after it is removed from the column, and until the permanent ties have been applied to it, after which these stays are removed and used again upon the next section which is severed from the column.

While with the feature of my invention above described, it is not essential that stays be applied to the section at the same time that it is severed from the column, yet in practice it is highly desirable and in the preferred form of my invention as herein shown, I have provided, in connection with the above noted feature, means which automatically apply stays to the bale section when it is severed from the column, and this constitutes another feature of my invention, for when the machine is so constituted I am enabled to utilize the stays in a novel manner to operate the automatic severing means and to cause it to operate automatically to sever the section or bale from the column at the same time that the temporary stays are applied to the severed section or bale.

After the automatic severing means has operated to sever a section or bale from the end of the column the machine is stopped and the severed section is removed from the machine, after which the machine is started again and continues in operation until the automatic bale severing means again operates. Heretofore not only has the bale severing means been controlled and operated by the operator, but, moreover, in machines as heretofore constructed after the severing means acted, the machine was stopped by the operator.

My improved machine also includes as a feature, in connection with the compressing mechanism, means which act automatically to stop the machine when a bale has been severed, and, preferably, the bale severing means, and the automatic means for stopping the machine, are so combined and arranged that the former controls and operates the latter, and causes it to act and stop the machine after the severing means has operated automatically to sever a section or bale from the column.

My improved machine further comprises novel bale removing means including a carriage which is carried by a support movable to and from the compressing mechanism, said carriage being adapted to support the bale, and to remove it from the compressing mechanism.

In its best form the carriage is a platform adapted to surround the bale and comprises sections pivoted, or otherwise suitably jointed together so that said sections may be moved into open or closed positions against or away from the bale. Means are also provided for opening and closing the sections, the latter operation being preferably performed by automatic means controlled by the bale to be removed, which act automatically to close the sections around the bale when the carriage has been moved into position to receive the same.

Other features of my improved machine are hereinafter described.

The machine herein shown is designed particularly for compressing cotton, and the cotton is delivered from the gins, as usual, into a hopper 1, whose walls are slotted to permit the passage therethrough of the pokers 2. Each poker 2 is journaled at its outer end upon a crank pin 3 fast to a sheave 4 journaled on a stud which is fast to a head plate 5. The crank pins 3 are each disposed out of parallelism with the axis of its respective sheave so that when the sheaves 4 are rotated the inner ends of pokers 2 are raised and lowered and at the same time they are drawn in and out through the slots of hopper 1 in such manner as to poke the cotton toward the slots 6 of the head plate 5. The head plate 5 is supported by standards 7 which rest on a base 8. Base 8 also supports the hydraulic ram 9, of usual construction, and the bearing ring 10 which carries the compression chamber and parts connected to rotate therewith.

The shaft 11 of the machine is driven by a belt (not shown) which passes around a pulley 12 constituting one member of a friction clutch, of usual construction, the other member of the clutch being shown at 13. Fast on the shaft 11 is a beveled pinion 14 which drives a bevel gear 15 fast on a vertical shaft 16 journaled in bearings on the frame of the machine. A loose sleeve 17, carrying an arm 18, is mounted on this shaft, and arm 18 carries a loose pulley 19. An endless belt 20 passes around sheaves 4 and pulley 19, and also around a pulley 21 keyed to shaft 16 as shown in Figs. 1 and 2. A spring 22 connects arm 18 with the frame of the machine and serves to keep belt 20 tight and to provide sufficient friction between the belt and the pulleys.

Beneath the slots 6 of the head plate 5 is arranged a sleeve 23 which constitutes the compression chamber. The sleeve 23 rests upon a gear sleeve 24 which in turn is supported by the bearing ring 10. The outer periphery of the flange of sleeve 24 is a gear which meshes with a pinion 25 fast on shaft 16. Below the gear sleeve 24 and bearing ring 10 is a collar 26, and below collar 26 is a knife supporting ring 27. Compression sleeve 23, gear sleeve 24, collar 26, and knife ring 27 are all securely locked together by bolts 28 so that said parts rotate in unison in the direction indicated by the arrow in Fig. 3 when the machine is in operation. Upon the hub of the knife supporting ring 27 is journaled a cam ring 29 provided with two cam grooves 30 and 31, and said cam ring 29 normally rotates with the knife supporting ring 27 but is capable of being stopped so as to move relatively to the knife supporting ring 27, as and for purposes which will be explained later. Upon the under side of the knife ring 27 are provided guide ways 32, four being herein shown spaced equidistant, in each of which is movably mounted a knife 33 carrying on its upper face a cam roll 34 which projects through a slot 35, in the knife supporting ring 27, into the cam groove 31 of cam ring 29. It will be clear therefore that relative movement of cam ring 29 and knife supporting ring 27 will cause knives 33 to be moved on ring 27 by grooves 31, toward and from the center or axis of the machine, into and out of the column of compressed cotton. Upon the under side of the knife ring 27 are also provided guide ways 36, herein shown as four in number, which alternate in position with the ways 32 in which knives 33 are mounted. In each of these guide ways 36 is arranged a slide 37, and each slide 37 carries a cam roll 38 which projects through a slot 39 provided in knife ring 27, into cam groove 30 of cam ring 29. It will be clear therefore that whenever relative movement occurs between cam ring 29 and knife ring 27 the slides 37 are moved in their ways, by groove 30, toward and from the center of the machine which is occupied by the column of compressed fiber. The cam grooves 30 and 31 are designed and shaped so as to be practically simultaneous in their action on their respective cam rolls and to move the knives 33 and slides 37 simultaneously.

Pivoted at 40 to each guide way 36 is a lever 41 which at its other or outer end is yieldingly supported by a spring 42 resting upon the head of a depending bolt 43 fast to knife ring 27. The inner ends of these levers 41 each support a bale stay 44 with its head 45 in front of the ends of a pair of opposed latches 46 pivotally mounted upon each slide 37, said latches being yieldingly held in their advance or projected position with their ends back of heads 45 by springs 47. When slides 37 are moved inwardly with knives 33 by the cam grooves 30 and 31, the latches 46 slide the heads 45 of the stays 44 along and past levers 41, and force them into the column of compressed cotton and at the same time knives 33 are forced into the column in the same plane with heads 45.

Each guide way 36 is provided with inclined ways or ledges 48 which facilitate the entrance of the head 45 of the stay into position in front of latches 46 when the stays are being placed in position, the latches 46 yielding as the head 45 passes them, and springing out behind the head after it has passed them. The forked levers 41 are widened at their ends and the springs 42 are placed at the side of the lever so that the head 45 of a stay may be entered at that end of the lever and then moved forward into position in front of latches 46.

At the lower end of each stay 44 is provided a hook 49 which is held in the path of the end of the growing column of cotton by means of a lever 50 pivoted at 51 to the head 45 of the stay. Between one arm of lever 50 and the stay is arranged a spring 52 which, by its pressure on lever 50, forces the other arm of said lever against the under side of slide 37, and by its pressure on the body of the stay, holds the stay in an inclined position with the hook 49 at its lower end in the path of the growing column.

Heretofore when the machine was in operation and a bale was to be severed, it was customary for the operator to cause the knives and bale stay heads to be forced into the column, but as stated above one of the objects of this invention consists in providing means which automatically causes this action when the column has grown to a predetermined size. In the embodiment of this feature of my invention as shown in the accompanying drawings, this result is secured by the engagement of the end of the growing column of cotton with the hooks 49 of the stays 44, which causes the automatic severing means to operate. The stays 44, as above described, are supported at their upper ends by the levers 41 which at their outer ends are yielding, and after the end of the column has reached hooks 49 the continued growth of the column brings a pressure to bear on stays 44 which forces the outer ends of levers 41 downward against the pressure of springs 42. Each lever 41 is provided at its outer end with a lug 53 and when that end of the lever is lowered by the pressure of the column on the stays 44, these lugs 53 are moved into the same plane with a trip lever 54 pivoted at 55 to the frame of the machine and one of these lugs 53 strikes and trips lever 54 against the pressure of a spring 56, and thereby releases a spring 57, see Fig. 3, which then moves a movable abutment 58, mounted on the frame of the machine, into the path of a lug 59 on cam ring 29 so that when lug 59 reaches that abutment the cam ring is stopped. This stopping of cam ring 29 occasions a relative movement between said ring and knife ring 27 with the result of projecting the knives and stays into the column, thus severing the bale and at the same time temporarily binding it.

In order that the cam ring 29 may be automatically released from the abutment immediately after the knives have been projected into the column, so that the cam ring may resume its travel with knife ring 27, leaving the knives projected to act as a support for the mass in the compression chamber, while the severed bale is removed and until the cam is returned to position beneath the mass in the compression chamber, a number of cams 60 are provided on the knife ring 27 which are so disposed thereon that after the cam ring 29 and knife ring 27 have been moved relatively far enough to project the knives into the column one of the cams 60 engages the abutment 58, and moves it in the opposite direction, against the pressure of spring 57, out of engagement with lug 59 and back into its normal position where it is caught and held by the spring pressed trip lever 54 thus preventing further relative movement of cam ring 29 and knife ring 27, and consequent withdrawal of the knives from their severing and supporting position. The movable abutment 58, which engages and stops the rotation of the cam ring is herein shown as a lever pivoted upon the under side of bearing ring 10. Arm 61 of abutment 58 is connected by a link 62 with one arm of a bell crank lever 63 pivoted at 64 to the frame of the machine. The other arm of bell crank 63 is connected by a link 65 with an arm 66 of a second abutment 58$^a$ which is pivoted at 67 to the frame of the machine. Spring 57 inclosed in a casing 68 fast to the frame of the machine, bears at one end against the end of said casing and at its other end against arm 66. The abutment 58$^a$ is arranged diametrically opposite abutment 58 and cam ring 29 is provided with two lugs 59 arranged diametrically opposite each other. Both abutments 58 and 58$^a$ work in unison, and act in the same manner upon cam ring 29, thereby giving a double resistance at points directly opposite each other to the shock of stopping the cam ring.

Pivotally mounted on one end of abutment 58 is a latch 69 between which and a lug 70 on abutment 58 is interposed a spring 71. Trip lever 54 is provided with a hook 72 adapted to engage the hook 73 of latch 69, and while these two hooks are in engagement spring 71 by its pressure on latch 69, acts to hold abutment 58 out of the path of lugs 59 on cam ring 29. This action is more clearly understood by considering the point of contact between hook 72 and hook 73 as a fulcrum, and the spring 71 the power which is acting on a lever, which is the latch 69. Inasmuch as the hook 72 when considered in this connection alone is immovable and latch 69 is pivoted to the movable abutment 58, abutment 58 is held by the power of spring 71 in its outermost position against the power of spring 57, the relative strength of these two springs and the connecting leverages being such that spring 71 has power sufficient to perform this function. When lever 54 is tripped by the engagement of one of the levers 41 with it, the two hooks 72 and 73 are disengaged and spring 57 freed, and in order that said hooks shall automatically reëngage when the abutments are moved back out of engagement with the lugs 59 by one of the cams 60 on the knife ring engaging lever 58, I provide latch 69 with a finger 74 which extends across the end of abutment 58 in a position to be between the end of abutment 58 and the lug 59 which engages therewith. Thus it will be seen that when lug 59 approaches abutment 58 it first moves and holds finger 74 against the end of abutment 58. This rocks latch 69 on its pivot and shifts hook 73 into such a position that when abutment 58 is moved back by one of the cams 60 on the knife ring, hook 73 is carried back past hook 72 before finger 74 has cleared the lug 59. The abutment 58 is provided with a cam roll 75 for engaging with the cams 60 on the knife ring.

During the interval of time between the entrance of the knives 33 into the column and the stopping of the machine, that portion of the column between the knives 33 and the head plate 5 continues to grow, and in order to prevent injurious strains being brought to bear upon the knives and their support, it is desirable to stop the machine as soon as possible after the insertion of the knives into the column so as to stop the growth of the column and thereby prevent injury to the knives and their support. I have, therefore, herein shown, in connection with the above described mechanism, means which automatically stop the machine immediately after the knives are thrust into the column. As herein shown this automatic feature comprises a forked extension 76 provided on the arm 61, which forked extension straddles a shipper rod 77. Rod 77 is supported at one end by extension 76, and at its other end it is connected with a lever 78 by which the member 13 of the friction clutch is operated. At that end of shipper rod 77 next the extension 76 said rod is made with a hollow end piece 79 which is open upon its under side and within this end piece is a latch 80 whose head 81 extends through the forked extension 76 (see Fig. 12). The head 81 is provided at each side with cam slots 82 into which project lugs 83 provided upon the interior of the end piece 79. Near its outer end latch 80 is provided with a lug 84 between which and the end of the hollow end piece 79 is arranged a spring 85 which acts to hold head 81 normally projected from the hollow end piece 79.

While the machine is in operation and before the abutments 58 and 58$^a$ have been moved into engagement with cam ring 29 the extension 76 occupies the full line position shown in Fig. 12, but when the abutments are thrown in toward cam ring 29 for the first time, the extension 76 is moved from the full line position shown in Fig. 12, to the left, into the dotted line position shown in said Fig. 12, and behind head 81. When one of the cams 60 reaches roll 75 the abutments are thrown out of engagement with lugs 59 on cam ring 29, and this outward movement of the abutment 58 moves the extension 76 to the right in Fig. 12 back to its first position carrying with it rod 77. This shifts the member 13 of the friction clutch in a direction to disconnect pulley 12 from the member 13 and to cause pulley 12 to run loose on shaft 11. It will thus be clear that after the abutments 58 and 58$^a$ have held cam ring 29 stationary long enough to project the knives and stay heads into the column, they are thrown out of engagement with cam ring 29 by cams 60, and this movement which disengages the abutment 58 from cam ring 29 actuates the shipper mechanism automatically and stops the machine. When a section or bale has been thus severed from the column and the machine stopped, the jack 9 is lowered and the severed section removed from the machine, after which the jack 9 is returned against the end of the column and the machine again started. Immediately after the machine has been started again, it is necessary that the knives which still remain in engagement with the column be retracted. This is accomplished by again momentarily stopping the rotation of cam ring 29 with knife ring 27. This is effected by the operator of the machine tripping lever 54 by hand, and for convenience in operating lever 54 a hand lever 86 is provided pivoted at 87 to abutment 58. Lever 86 bears against lever 54 and by moving it in one direction it acts to disengage hook 72 from hook 73 as will be clear from Fig. 13. If, when the abutments 58 and 58$^a$ are in this manner thrown in to stop cam ring 29 for the second time, to retract the knives, extension 76 had the same range of movement as when it was operated for the first time to project the knives and stop the machine, then extension 76 would again pass behind head 81 and when returned to its normal position it would again shift rod 77 and stop the machine for the second time, which is unnecessary. Therefore, I have herein provided means which act to prevent extension 76 moving far enough (to the left in Fig. 13) to engage head 81 of latch 80, when the abutments are moved in to stop cam ring 29 for the second time, in order to retract the knives 33. The means referred to includes a second pair of lugs 88 provided on the cam ring 29. Before the first operation of the abutments 58 and 58ª, which is occasioned to project the knives into the column, the cut away portions of the cam ring 29 located in front of lugs 88 is closed to the entrance of the abutments 58 and 58ª by bridge pieces 89, pivoted at 90 upon the under side of cam ring 29. Up to the time when the first relative movement between cam ring 29 and knife ring 27 begins, that is before the knives are projected, the outer ends of bridge pieces 89 are each supported and held in this position by a shoulder or ledge 91 provided upon the upper side of cams 60; it being understood that while the knives are in their retracted position one of these cams 60 on knife ring 27 is opposite this cut away portion of the cam ring as shown in Fig. 13. Should lever 54 be tripped by one of the levers 41 at a time when one of the lugs 88 was approaching abutment 58, the bridge piece 89, being then supported at its end by the shoulder or ledge 91, acts to prevent the entrance of the abutment and to cause it to pass lug 88 and to engage lug 59 as shown in Fig. 14. The continued rotation of knife ring 27 after cam ring 29 has been thus stopped, carries the cam 60 away from under bridge piece 89 as shown in Fig. 14, and at the same time the knives are projected into the column. When the next cam 60 reaches roll 75, autment 58 is thrown out of engagement with cam ring 39 and simultaneously with this movement rod 77 is shipped by arm 76 to stop the machine.

In restarting the machine after the removal of the severed bale, the operator grasps a handle 92 provided on the end of latch 80 and disengages that latch from arm 76, when rod 77 is free to be moved by him back into its first position again, which starts the machine. The machine is then running with the knives projected under the column and it is necessary that they be immediately withdrawn after the machine is started. This is accomplished by the operator manipulating lever 86 and tripping lever 54 by hand and he does this at a time when one of the lugs 88 is approaching abutment 58. As bridge piece 89 is then unsupported at its end by shoulder 91 on cam 60 the abutment 58 enters the cutaway portion of cam ring 29 in front of the lug 88 as shown in Fig. 15 and engaging therewith, stops cam ring 29 a second time and during this second dwell of cam ring 29 the continued rotation of knife ring 27 retracts the knives and brings the next cam 60 up into the position, relatively to lug 88 and bridge piece 89, which was occupied by one of the cams 60 in advance of it, causing abutment 58 to be disengaged from lug 88, and bridge piece 89 to be again supported by a shoulder 91 as in Fig. 13. Bridge piece 89 is in the same plane with cam roll 75 and is provided with a projection 93 which engages with the periphery of cam ring 29 and thereby limits the inward movement of said bridge piece and therefore of the abutment, and this inward movement of the bridge piece is so limited by lug 93 as to prevent abutment 58 moving in far enough to carry arm 76 into position to engage head 81 of latch 80 as will be clear from Fig. 15. It will thus be seen that bridge piece 89 serves two functions, that is, it serves to shield lug 88 from abutment 58 when the knives are to be projected, and also as a stop to limit the movement of abutment 58 and extension 76 so as to prevent the stopping of the machine when the knives are to be retracted.

It is highly desirable that when the abutments 58 and 58ª are disengaged from the cam ring 29, that the cam ring 29 immediately resume its rotation with the knife ring 27, and it is also desirable that when the cam ring and knife ring are rotating together that the two shall be so connected as to prevent any relative movement. To attain these ends lugs 59 and 88 are provided upon a pair of plates 94 which are movably connected with cam ring 29 by means of slots 95 and bolts 96 so as to have a limited sliding movement relatively thereto. Each of the plates 94 is provided upon its under face with a lug 97 between which and a lug 98 fast to cam ring 29 is arranged a spring 99. Each plate 94 also has fast to it one end of a band 100 which encircles part of the periphery of the knife ring 27 and which at its other end is secured to a stud 101 depending from cam ring 29. Normally springs 99 act on plates 94 to draw the bands 100 tightly around the periphery of knife ring 27 but when the lugs on the plates are engaged by the abutments 58 and 58ª said plates slide relatively on cam ring 29 to the limit of slots 95, and in opposition to springs 99 and bands 100 are disengaged from knife ring 27. When the abutments 58 and 58ª are freed from the lugs on the plates 94, springs 100 shift plates 94 in the opposite direction and thereby immediately tighten bands 100 again, so that cam ring 29 immediately resumes its travel with knife ring 27.

The hooks 49 at the lower ends of the stays 44 are each pivoted at 102 to the body 103 of the stay and said hooks are each locked in its operative position with its lower end substantially perpendicular to body 103 by a latch 104 pivoted at 105 to body 103. Between a tail piece 106 on latch 104 and body 103 is arranged a spring 107 which holds the end of latch 104, carrying a roll 108, in engagement with the tail of hook 49. The purpose of latch 104 is to provide a quick release of the stay from the bale to which it has been applied by the machine. After a bale or section has been severed and stayed and then removed from the machine, the permanent ties are applied to the bale and the stays 44 are removed and replaced in the machine. Their removal is quickly effected by swinging latch 104 against the pressure of spring 107 so as to free hook 49, when the stay becomes released from the bale. After the knives have been projected into the column and the stays have been attached thereto, the machine automatically stops and it then remains to remove the severed bale from the machine. This is accomplished by the improved bale removing means which I will now describe, reference being had particularly to Figs. 2, 4, 5, 6 and 7.

Pivoted at 109 and 110 upon base 8 are two pairs of levers 111 and 112 connected by links 113 and arranged upon opposite sides of jack 9. To levers 111 and 112 are pivotally connected at 114 and 115, the lower ends of two pairs of bars 116. The other ends of bars 116 are pivotally connected, at 117 and 118, to a curved platform 119, comprising a middle section which is preferably made as about one half of a circle, and to the ends of which are movably connected two curved extensions 120 which practically complete the circle. The platform 119 normally occupies the position indicated by dotted lines at A in Fig. 4, with levers 111 and 112 in the position also indicated by dotted lines in said figure, and with the curved extensions 120 in the positions indicated by dotted lines in Fig. 5. When the machine has been stopped automatically as above described and a bale is to be removed therefrom, the operator, by means of a lever 121, swings platform 119 upwardly against and around the severed bale as shown by full lines in Fig. 4; the extensions 120 then occupying the positions shown by full lines in Fig. 5. Lever 121 is fast to one of the levers 112 to which is also fast an arm 122, the latter being provided with an offset lug 123, indicated by dotted lines in Fig. 4, which extends across and back of the adjacent bar 116.

The lower ends of levers 50 on the heads of the stays 44 provide shoulders 124, and after platform 119 has been placed in position around the bale as above described the operator lowers jack 9 until shoulders 124 engage the platform. After the jack is freed from the bale, the operator, by means of lever 121, swings platform 119 to one side on the pivots 109 and 110 into the position shown by dotted lines B in Fig. 4, seating the bale upon a suitable support arranged to receive it. After the extensions 120 have been swung open the platform is lowered to the position shown at A again.

The extensions 120 are made in the form of bell crank levers and to the short arm of each is connected, by a universal joint, one end of a rod 125, the other end of which is connected, by a universal joint, with one arm of bell crank levers 126. These two levers 126 are fast to the ends of a rock bar 127 journaled in lugs 128 on platform 119. Surrounding rock bar 127 is a spring 129, one end of which is fast to one of the lugs 128, and the other end is fast to a sleeve 130 which is fastened to rock bar 127. This spring 129 is arranged to exert its power on rock bar 127 in a direction to move and hold extensions 120 in their closed positions as indicated by full lines in Fig. 5. Fast at its ends to a rock bar 131 is a depending and inwardly projecting trip lever 132 one arm of which carries a lug 133 arranged to coöperate with a lug 134 provided on sleeve 130. The two ends of lever 132 are connected by a cross bar 135 which is engaged near its middle by the head of a bolt 136, mounted in a lug on platform 119 and acted upon by a spring 137. The function of this spring is to hold the free end of the lever 132 in its innermost position toward the center of the platform, and with lug 133 in the path of lug 134 on sleeve 130. In order to move the platform from the position shown at B, Fig. 4, to the position shown at A in said figure, the extensions 120 are swung into their outermost positions as indicated by dotted lines in Fig. 5. To accomplish this, the operator grasps the free arms of levers 126 by hand and swings them down, this movement of the lever 126, acting through the rods 125, swings extensions 120 outwardly against the resistance of spring 129, at the same time the operator lowers platform 119 to the position indicated by the dotted lines at A away from the bale, which allows lever 132 to swing inwardly toward the center of the platform. This inward movement of lever 132, occasioned by its spring, brings lug 133 into the path of lug 134, and when levers 126 are released by the operator, spring 129 turns rock bar 127, and with it sleeve 130, until lug 134 is brought to bear against the end of lug 133 when further rotation of rock bar 129 and further inward movement of extensions 120 is prevented until lug 133 is moved out of the path of lug 134.

When platform 119 is swung by the operator up into position to receive a bale, the extensions are held open by the engagement of lugs 133 and 134 as above described, with spring 129 under considerable tension, but when lever 132 is brought to bear against the bale further movement of platform 119 toward the latter swings lever 132 on its axis 127 and moves lug 133 out of the path of lug 134. This frees spring 129 which through its connections with rock bar 127 shifts extensions 120 into their closed positions as shown in Fig. 5. When lug 133 is thus disengaged from lug 134, the latter is carried past the former to and against a stop lug 138 provided on platform 119 as shown in Fig. 7, which prevents further movement of rock bar 127 in that direction. When the bale has been removed to the position indicated at B in Fig. 4 levers 126 are again manipulated by the operator, as described above, to open extensions 120 which operation reëngages the lugs 133 and 134 and resets trip lever 132.

The operation of the machine is as follows: After the compressed column of material has grown to a certain extent below knife ring 27, and while the machine is still in operation, the bale stays 44 are placed in position in the machine with their heads 45 resting on levers 41 in front of latches 46 on slides 37 and with the hooks 49 of the stays 44 projecting into the path of the end of the column. After the column has grown sufficiently, its end engages hooks 49 on the bale stays, and forces the stays downwardly, and the bale stays 44 pull the levers 41 down until the path of the lugs 53 on levers 41 is brought into the same plane with trip lever 54. One of these lugs 53 then strikes and trips lever 54 thereby releasing spring 57 which throws the abutments 58 and 58ᵃ in toward cam ring 29 and into the path of lugs 59 on plates 94. When the lugs 59 are brought into engagement with the abutments 58 and 58ᵃ the plates 94 are shifted on cam ring 29 for a short distance, and the frictional bands 100 are freed from engagement with the flange of the knife ring 27. Thereby, the cam ring is disconnected from the knife ring and stopped while the knife ring continues to revolve, the springs 99 thus performing a function as buffers to receive the shock due to the sudden stopping of the cam ring 29. The continued revolution of the knife ring carries the cam rolls on the knives 33 and bale stay slides 37, along grooves 30 and 31 in cam ring 29, thus projecting the knives and stays into the column and as soon as the knives and stays have reached the limit of their inward movement one of the cams 60 on the knife ring 27 has reached the roller 75 on abutment 58, and by its engagement therewith throws abutments 58 and 58ᵃ out of engagement with lugs 59 on cam ring 29. The movement of abutment 58 into the path of lug 59 by spring 57 carries extension 76 into position back of head 81 on latch 80, so that when a cam 60 moves abutment 58 back again out of engagement with lug 59, that movement carries extension 76 in the opposite direction, and extension 76 at that time engages the head 81 and shifts rod 77 endwise to stop the machine.

Immediately after the machine is stopped with the knives and bale stays in the column, the operator swings platform 119 up around the column from its normal position indicated at A in Fig. 4. When the platform 119 reaches the column the lever 132 is tripped and spring 129 thereby is freed and acts through the connections above described to close the extensions 120 around the column. The operator then lowers the jack which is followed down by the severed section or bale, which is that part of the column below the knives, and to which the bale stays have been applied. This separates the severed section from that portion of the column remaining in the machine, and also brings the shoulders 124 on the stays to bear upon the top of platform 119 and arms 120 by which the bale is then supported. The operator then manipulates lever 121 by which he swings the platform to one side as indicated at B, Fig. 4, and deposits the bale upon a suitable support arranged to receive it. The platform 119 and extensions 120 at this time surround the bale stays 44 on the severed bale, thereby serving as a bale stay band to prevent the stays falling off, or from being forced off the bale by the enormous pressure exerted on them by the latter. After the bales have been thus removed from the machine the operator immediately raises jack 9 up again against the end of the column and then starts the machine in operation again by manipulating handle 92 and rod 77.

Immediately after the machine has been started the operator trips lever 86 by hand, releasing spring 57 which for the second time throws the abutments 58 and 58ᵃ in toward cam ring 29 in front of lugs 88. As the bridge pieces 89 are at this time unsupported by a cam 60 on the knife ring 27 on account of said cams having been moved away from under said bridge pieces when the abutments were thrown in for the first time, the abutments enter into engagement with lugs 88 and stop cam ring 29 for the second time. The continued revolution of knife ring 27 carries the cam rolls of slides 37 and knives 33 along grooves 30 and 31 of cam ring 29 thereby withdrawing the knives from the column and retracting the slides. When the knives and slides have reached the limit of their outward movement, one of the cams 60 on knife ring 27 has reached and engages roll 75 thereby throwing the abutments back out of engagement with lugs 88, where they are caught and held by the interlocking of hooks 72 and 73. It may be noted at this point that if roll 75 was only thrown out from the path of cams 60 as far as such cams would throw it, then whenever one of these cams 60 passed roller 75 it would strike roller 75 slightly which would be objectionable. To avoid this, therefore, the action of spring 71 on latch 69 is such that, after the reëngagement of hooks 72 and 73, said spring moves the abutments out a little farther than they were moved by cams 60 which removes roll 75 entirely out of the path of cams 60. Upon the occasion of the second operation of the abutments 58 and 58ª, as above described, the bridge pieces 89 act to prevent the abutments having as great an extent of movement as upon the occasion of their first operation when they engaged lugs 59. This prevents extension 76 moving far enough to engage head 81 to stop the machine. The mechanism is also so arranged that, upon the occasion of this second operation of the abutments, when they are thrown out by one of the cams 60, the shoulder 91 on that cam, and on one diametrically opposite, engage lugs 93 on bridge piece 89 and thereby move and hold bridge pieces 89 in their outermost position again so as to close the cutaway portion of the cam ring in front of lugs 88.

Fig. 13 shows the position of abutment 58 when the machine is running. Fig. 14 shows the position of abutment 58 just after lever 54 has been tripped automatically. Fig. 15 shows the position of the abutment 58 after lever 86 has been tripped by hand to retract the knives and slides. After the press has been started again, as above described, the operator applies the permanent ties to the removed bale, and removes the bale stays and hangs them in the slides 37 while the press is running. He then manipulates the levers 126 on platform 119 throwing extensions 120 out, and lowers platform 119 into the position shown at A. Fig. 4, the arm 122 resting against some stationary part of the machine.

In order to assist the operator in lifting the platform back into position around the compressed column, a spring 139 is provided one end of which rests against the under side of platform 119 and other end of which is secured to one of the bars 116 in such manner as to tend to force these two parts apart.

I have described herein a bale stay which is illustrated in Fig. 8, but I have not claimed the said bale stay in this application, it being my intention to file a separate application for a patent for the invention embodied in said bale stay.

What I claim is:

1. In a machine for compressing fibrous materials, in combination, means for compressing the fiber into a column, and means for automatically severing a section from the column and for applying stays to the severed section when the column has reached a predetermined size.

2. In a machine for compressing fibrous materials, in combination, means for compressing the fiber into a column; means for automatically severing a section from the column when the latter has reached a predetermined size; and means for automatically stopping the action of the compressing means when a section is severed from the column.

3. In a machine for compressing fibrous materials, in combination, means for compressing the fiber into a column; means for automatically severing a section from the column and for applying stays thereto when the column has reached a predetermined size; and means for automatically stopping the operation of the compressing means when a section has been severed from the column.

4. In a machine for compressing fibrous materials, in combination, means for compressing the fiber into a column; means for automatically severing a section from the column when the latter has reached a predetermined size; and means for automatically stopping the machine when a section is severed from the column.

5. In a machine for compressing fibrous materials, in combination, means for compressing the fiber into a column; means for automatically severing a section from the column and for applying stays thereto when the column has reached a predetermined size, and means for automatically stopping the machine when a section is severed from the column.

6. In a machine for compressing fibrous materials, in combination, means for compressing the fiber into a column; means for severing a section from the column; means controlled by the column for automatically operating said severing means when the column has reached a predetermined size; and automatic means for stopping the machine when a section is severed from the column.

7. In a machine for compressing fibrous materials, in combination, means for compressing the fiber into a column; means for severing a section from the column; a movable abutment for operating said severing means; and automatic means controlled by the column to cause the abutment to operate the severing means when the column has reached a predetermined size.

8. In a machine for compressing fibrous materials, in combination, means for compressing the fiber into a column; a knife support adapted to rotate with the column; knives carried by said support; actuating means for the knives, and automatic means controlled by the column for operating the knife actuating means to project the knives into the column when the latter has reached a predetermined size.

9. In a machine for compressing fibrous materials, in combination, means for compressing the fiber into a column; a knife support adapted to rotate with the column; knives carried by said support; actuating means for the knives adapted to travel with the knife support; a movable abutment for operating said actuating means; a support therefor; and means controlled by the column for automatically moving the abutment into engagement with the knife actuating means to project the knives into the column when the latter has reached a predetermined size.

10. In a machine for compressing fibrous materials, in combination, means for compressing the fiber into a column; a knife support adapted to rotate with the column; knives carried by said support; actuating means for said knives adapted to travel with the knife support; a movable abutment for operating said actuating means; a support for said abutment; means controlled by the column for automatically moving the abutment into engagement with the knife actuating means to project the knives into the column when the latter has reached a predetermined size; and means for moving the abutment out of engagement with said knife actuating means when the knives have been projected into the column.

11. In a machine for compressing fibrous materials, in combination, means for compressing the fiber into a column; a knife support adapted to rotate with the column; knives carried by said support; actuating means for said knives adapted to travel with the knife support; a movable abutment for operating said actuating means; a support for said abutment; means controlled by the column for automatically moving the abutment into engagement with the knife actuating means to project the knives into the column when the latter has reached a predetermined size; means for moving the abutment out of engagement with said knife actuating means when the knives have been projected into the column; and means connected with and operated by the abutment for stopping the machine when said abutment is moved out of engagement with the knife actuating means.

12. In a machine for compressing fibrous materials, in combination, means for compressing the fiber into a column; a knife support adapted to rotate with the column; knives carried by said support; actuating means for said knives adapted to travel with the knife support; a movable abutment for operating said actuating means; a support for said abutment; means controlled by the column for automatically moving the abutment into engagement with the knife actuating means to project the knives into the column when the latter has reached a predetermined size; means for moving the abutment out of engagement with said knife actuating means when the knives have been projected into the column; means connected with and operated by the abutment for stopping the machine when said abutment is moved out of engagement with the knife actuating means; and means for operating the knife actuating means to retract the knives.

13. In a machine for compressing fibrous materials, in combination, means for compressing the fiber into a column; a knife support adapted to rotate with the column; knives carried by said support; actuating means for said knives adapted to travel with the knife support; a movable abutment for operating said actuating means; a support for said abutment; means controlled by the column for automatically moving the abutment into engagement with the knife actuating means to project the knives into the column when the latter has reached a predetermined size; means for moving the abutment out of engagement with said knife actuating means when the knives have been projected into the column; means for stopping the machine after the abutment is moved out of engagement with the knife actuating means; means for moving the abutment into engagement with the knife actuating means to retract the knives after the machine has been started again; and means for moving the abutment out of engagement with said actuating means after the knives have been retracted.

14. In a machine for compressing fibrous materials, in combination, means for compressing the fiber into a column; a knife support adapted to rotate with the column; knives carried by said support; actuating means for said knives adapted to travel with the knife support; a movable abutment for operating said actuating means; a support for said abutment; means controlled by the column for automatically moving the abutment into engagement with the knife actuating means to project the knives into the column when the latter has reached a predetermined size; means for moving the abutment out of engagement with said knife actuating means when the knives have been projected into the column; means connected with and operated by the abutment for stopping the machine when said abutment is moved out of engagement with the knife actuating means; means controlled by the operator for moving the abutment into engagement with the knife actuating means a second time to retract the knives after the machine has been started again; means for moving the abutment out of engagement with the knife actuating means after the knives have been retracted, and means to prevent the second operation of the abutment from stopping the machine.

15. In a machine for compressing fibrous materials, in combination, means for compressing the fiber into a column; a knife support adapted to rotate with the column; knives carried by said support; actuating means adapted to rotate with the knife support; means for operating the knife actuating means to project the knives into the column when the latter has reached a predetermined size; means connecting the knife support and knife actuating means adapted to normally act to prevent relative movement of said parts; and means for disconnecting the knife support and knife actuating means when the latter is operated.

16. In a machine for compressing fibrous materials, in combination, means for compressing the fiber into a column; a knife support adapted to rotate with the column; knives carried by said support; a cam ring for actuating the knives adapted to rotate with the knife support; a movable member mounted on the cam ring; a brake band for engaging the knife support connected at one end with the cam ring and at its other end with said movable member; a spring for holding the movable member with the brake band normally in engagement with the knife support; and a movable abutment adapted to be moved into the path of the movable member to disengage the brake band from the knife support, stop the cam ring and project the knives into the column.

17. In a machine for compressing fibrous materials, in combination, means for compressing the fiber into a column; a knife support adapted to rotate with the column; knives carried by said support; a cam ring for actuating the knives adapted to normally rotate with the knife support; a movable member mounted on the cam ring; a brake band for engaging the knife support, connected at one end with the cam ring and at its other end with the movable member; a spring for holding the movable member with the brake band normally in engagement with the knife support; a movable abutment adapted to be moved into the path of the movable member to disengage the brake band from the knife support and stop the cam ring, to project the knives into the column; and means on the knife support for moving the abutment out of the path of the movable member on the cam ring after the knives have been projected into the column.

18. In a machine for compressing fibrous materials, in combination, means for compressing the fiber into a column; a knife support adapted to rotate with the column; knives carried by said support; a cam ring for actuating the knives adapted to normally rotate with the knife support; a movable member mounted on the cam ring; a brake band for engaging the knife support connected at one end with the cam ring and at its other end with the movable member; a spring for holding the movable member with the brake band normally in engagement with the knife support; a movable abutment adapted to coöperate with the movable member; means controlled by the column for automatically moving the abutment into the path of the movable member to disengage the brake band from the knife support and stop the cam ring to project the knives into the column; and means on the knife support for automatically moving the abutment out of the path of the movable member on the cam ring after the knives have been projected into the column.

19. In a machine for compressing fibrous materials, in combination, means for compressing the fiber into a column; a knife support adapted to rotate with the column; knives carried by said support; slides mounted on said knife support; actuating means for said knives and slides adapted to travel with said knife support; movable stay holders mounted on said knife support; stays, supported by the stay holders in the path of said slides and in the path of the column; a movable abutment for engaging said actuating means; a support for said abutment; and means for operating said abutment adapted to coöperate with the movable stay holders on the knife support, all organized and operating when the column has reached a predetermined size, to cause the stays to shift their support into position to engage the controlling means for the abutment and move the abutment into engagement with the actuating means for the knives and slides, which are thereby projected into the column.

20. In a machine for compressing fibrous materials, in combination compressing mechanism; a bale removing carriage; and a vertically swinging support for the carriage adapted to guide the latter to and from the compressing mechanism.

21. In a machine for compressing fibrous materials, in combination, compressing mechanism; a bale removing carriage; and a vertically movable support for the carriage adapted to guide the latter to and from the compressing mechanism.

22. In a machine for compressing fibrous materials, in combination, compressing mechanism; a bale removing carriage; a swinging support for the carriage adapted to guide the latter to and from the compressing mechanism and comprising upper and lower portions pivotally connected together with provision for limited relative movement in one direction; and a lever carried by the lower portion of the support.

23. In a machine for compressing fibrous materials, in combination, compressing mechanism; a platform made up of sections movably connected together and adapted to encircle and support a bale; and a movable support for the platform adapted to guide the latter to and from the compressing mechanism.

24. In a machine for compressing fibrous materials, in combination, compressing mechanism; a platform made up of sections movably connected together and adapted to encircle and support a bale; means for opening and closing the platform; and a movable support for the platform adapted to guide the latter to and from the compressing mechanism.

25. In a machine for compressing fibrous materials, in combination, compressing mechanism; a platform made up of sections movably connected together and adapted to encircle and support a bale; a movable support for the platform adapted to guide the latter to and from the compressing mechanism; and means for closing the platform around the bale when it is moved into position to receive the latter.

26. In a machine for compressing fibrous materials, in combination, compressing mechanism; a platform made up of sections movably connected together and adapted to encircle a bale; a movable support for the platform adapted to guide the latter to and from the compressing mechanism; and automatic means for closing the platform around the bale when it is moved into position to receive the latter.

27. In a machine for compressing fibrous materials, in combination, compressing mechanism; a platform made up of sections movably connected together and adapted to encircle and support a bale; a movable support for the platform adapted to guide the latter to and from the compressing mechanism; means for opening the sections and means for automatically closing them around the bale when the platform is moved into position to receive the bale.

28. In a machine for compressing fibrous materials, in combination, means for compressing the fiber into a column; means for severing a section from the column; a carriage for removing the severed sections from the column, and means for supporting the carriage with provision for movement of the same to and from the column.

29. In a machine for compressing fibrous materials, in combination, means for compressing the fiber into a column; means for severing a section from the column; a carriage; and a swinging support for the carriage adapted to guide the carriage to and from the column.

30. In a machine for compressing fibrous materials, in combination, means for compressing the fiber into a column; means for severing a section from the column, a carriage for removing the severed section; and a movable support for the carriage adapted to guide the carriage to and from the column.

31. In a machine for compressing fibrous materials, in combination, means for compressing the fiber into a column; means for severing a section from the column; a carriage for removing the severed section from the column; a swinging support for the carriage comprising one or more pairs of parallel levers adapted to guide the carriage to and from the column.

32. In a machine for compressing fibrous materials, in combination, means for compressing the fiber into a column; means for severing a section from the column; a platform made up of sections movably connected together and adapted to encircle and support the severed bale section; and a movable support for the platform adapted to guide the latter to and from the column.

33. In a machine for compressing fibrous materials, in combination, means for compressing the fiber into a column; means for severing a section from the column; a platform for receiving the severed section, made up of sections movably connected together and adapted to encircle and support the severed bale section; means for opening and closing the platform; and a movable support for the platform adapted to guide the latter to and from the column.

34. In a machine for compressing fibrous materials, in combination, means for compressing the fiber into a column; means for severing a section from the column; a platform made up of sections movably connected together and adapted to encircle and support the severed bale section; a movable support for the platform adapted to guide the latter to and from the column; and means for closing the platform around the column when it is moved into position to receive the severed bale section.

35. In a machine for compressing fibrous materials, in combination, means for compressing the fiber into a column; means for severing a section from the column; a platform adapted to encircle and support the severed bale section, made up of sections movably connected together; a movable support for the platform adapted to guide the latter to and from the column; and automatic means for closing the platform around the column when it is moved into position to receive the severed section.

36. In a machine for compressing fibrous materials, in combination, means for compressing the fiber into a column; means for severing a section from the column; a platform made up of sections movably connected together and adapted to encircle and support the severed bale section; a movable support for the platform adapted to guide the latter to and from the column; means for opening the sections and means for automatically closing them around the column when the platform is moved into position to receive the severed section.

WATSON M. HOLMES.

Witnesses:
  FRANK M. CHANDLER,
  EVERETT E. KENT.